United States Patent
Yamada

(10) Patent No.: US 8,761,461 B2
(45) Date of Patent: Jun. 24, 2014

(54) IMAGE PROCESSING APPARATUS AND CONTROL METHOD THEREFOR, AS WELL AS STORAGE MEDIUM

(75) Inventor: Satoshi Yamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/531,004

(22) Filed: Jun. 22, 2012

(65) Prior Publication Data

US 2013/0004029 A1  Jan. 3, 2013

(30) Foreign Application Priority Data

Jun. 30, 2011  (JP) .................................. 2011-145590

(51) Int. Cl.
*G06K 9/00* (2006.01)
(52) U.S. Cl.
USPC ......................................................... 382/118
(58) Field of Classification Search
None
See application file for complete search history.

(56) References Cited

U.S. PATENT DOCUMENTS

| | | | | |
|---|---|---|---|---|
| 8,064,651 B2 * | 11/2011 | Sukegawa et al. | ............ | 382/118 |
| 8,254,645 B2 * | 8/2012 | Okubo | ............ | 382/118 |
| 8,311,272 B2 * | 11/2012 | Matsugu et al. | ............ | 382/103 |
| 2011/0063441 A1 * | 3/2011 | Asa et al. | ............ | 348/143 |
| 2013/0050502 A1 * | 2/2013 | Saito et al. | ............ | 348/169 |

FOREIGN PATENT DOCUMENTS

JP  2009-163555  7/2009

* cited by examiner

*Primary Examiner* — Vikkram Bali
(74) *Attorney, Agent, or Firm* — Cowan, Liebowitz & Latman, P.C.

(57) ABSTRACT

An image processing apparatus capable of improving the usability in search by, for a person presumed to be difficult to be misidentified, improving the frequency of identifying the person. When calculated degree of similarity is equal to or greater than a threshold, it is identified that a face of the person corresponds to a face of any one of registered persons. The threshold is set to a second value greater than a first value, for the face of one of the registered persons who has not been identified when starting recording of the image, and the threshold is set to a third value between the first value and the second value, for the face of one of the registered persons who is already identified when starting the recording of the image, after the recording of the shot image to the nonvolatile recording medium is started.

14 Claims, 14 Drawing Sheets

FIG.2

| REGISTERED IMAGE | NAME | REGISTRATION NUMBER | FEATURE VALUE |
|---|---|---|---|
| (angry face) | SATOSHI | 1 | C1 |
| (neutral face) | MASAHIRO | 2 | C2 |

FIG.3

FACE DETECTION /IDENTIFICATION PROCESS

FACE DETECTION PROCESS — S301

PURSUIT JUDGMENT PROCESS — S302

IDENTIFICATION EXECUTION JUDGMENT PROCESS — S303

EXTRACTION PROCESS — S304

COLLATION PROCESS — S305

COLLATION JUDGMENT PROCESS — S306

IDENTIFICATION JUDGMENT PROCESS — S307

END

FIG.4

| NUMBER | HORIZONTAL POSITION | VERTICAL POSITION | SIZE | IDENTIFICATION CANDIDATE PERSON | THE NUMBER OF IDENTIFICATIONS |
|---|---|---|---|---|---|
| 1 | 320 | 200 | 200 | 0 | 0 |
| 2 | 100 | 100 | 100 | 2 | 3 |
| 3 | 540 | 100 | 100 | 0 | 0 |

FIG.5

|  | DEGREE OF SIMILARITY WITH REGISTRATION NUMBER 1 | DEGREE OF SIMILARITY WITH REGISTRATION NUMBER 2 |
|---|---|---|
| COLLATION RESULT FOR ELEMENT [1] IN SUBJECT LIST | 40 | 60 |
| COLLATION RESULT FOR ELEMENT [2] IN SUBJECT LIST | 20 | 70 |
| COLLATION RESULT FOR ELEMENT [3] IN SUBJECT LIST | 50 | 40 |

FIG.9A (A)

| NUMBER | HORIZONTAL POSITION | VERTICAL POSITION | SIZE | IDENTIFICATION CANDIDATE PERSON | THE NUMBER OF IDENTIFICATIONS |
|---|---|---|---|---|---|
| 1 | 250 | 205 | 60 | 1 | 3 |

(B)

| PERSON ALREADY IDENTIFIED AT THE TIME OF STARTING RECORDING |
|---|
| 0 |

(C)

| IDENTIFIED PERSON |
|---|
| 1 |

FIG.9B (A)

| NUMBER | HORIZONTAL POSITION | VERTICAL POSITION | SIZE | IDENTIFICATION CANDIDATE PERSON | THE NUMBER OF IDENTIFICATIONS |
|---|---|---|---|---|---|
| 1 | 230 | 203 | 60 | 1 | 3 |

(B)

| PERSON ALREADY IDENTIFIED AT THE TIME OF STARTING RECORDING |
|---|
| 1 |

(C)

| IDENTIFIED PERSON |
|---|
| 1 |

FIG.9C (A)

| NUMBER | HORIZONTAL POSITION | VERTICAL POSITION | SIZE | IDENTIFICATION CANDIDATE PERSON | THE NUMBER OF IDENTIFICATIONS |
|---|---|---|---|---|---|
| 2 | 150 | 140 | 100 | 0 | 0 |

(B)

| PERSON ALREADY IDENTIFIED AT THE TIME OF STARTING RECORDING |
|---|
| 1 |

(C)

| IDENTIFIED PERSON |
|---|
| 0 |

FIG.9D (A)

| NUMBER | HORIZONTAL POSITION | VERTICAL POSITION | SIZE | IDENTIFICATION CANDIDATE PERSON | THE NUMBER OF IDENTIFICATIONS |
|---|---|---|---|---|---|
| 2 | 160 | 142 | 110 | 2 | 3 |
| 3 | 260 | 203 | 60 | 1 | 3 |

(B)

| PERSON ALREADY IDENTIFIED AT THE TIME OF STARTING RECORDING |
|---|
| 1 |

(C)

| IDENTIFIED PERSON |
|---|
| 1,2 |

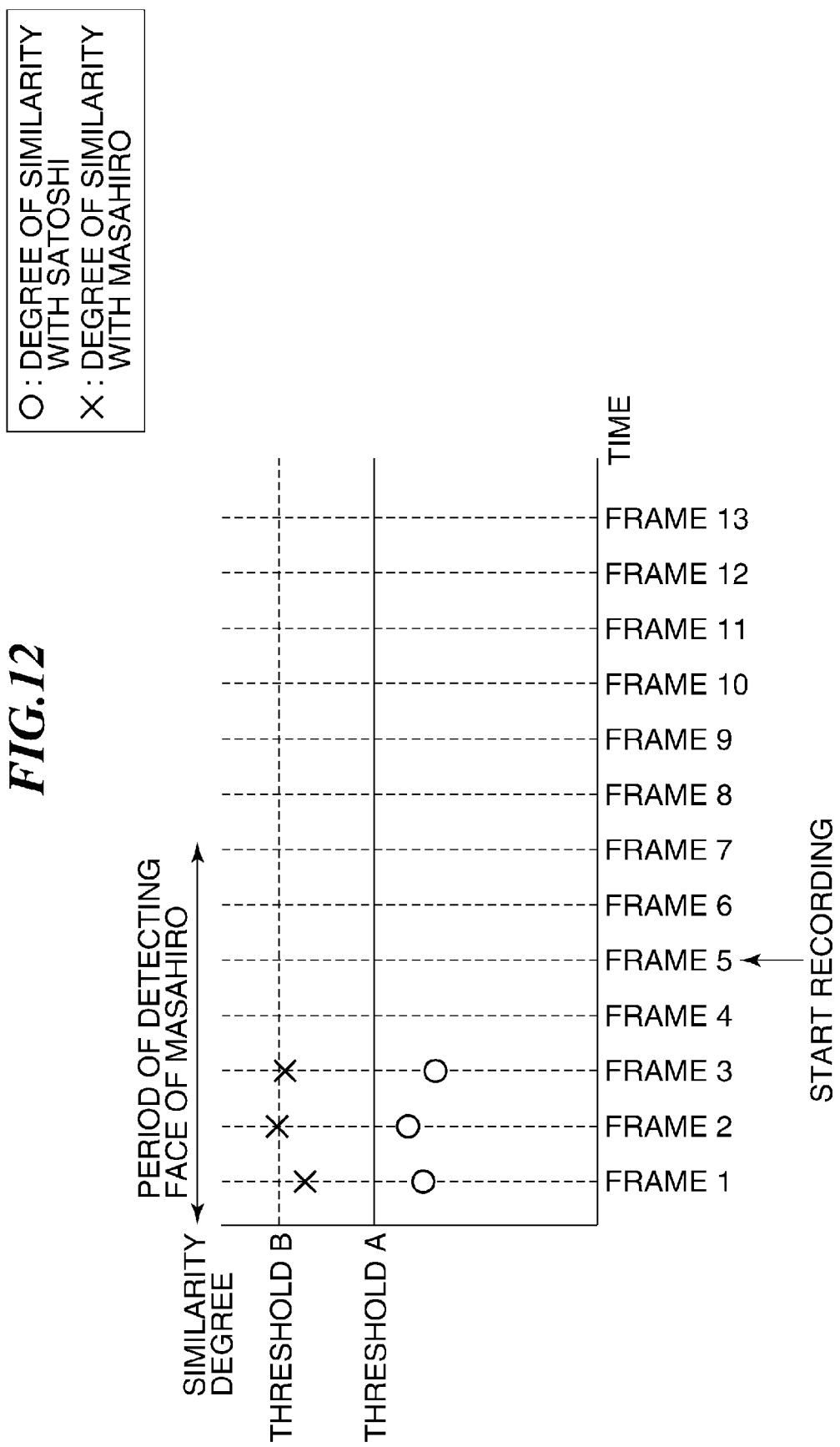

IMAGE PROCESSING APPARATUS AND CONTROL METHOD THEREFOR, AS WELL AS STORAGE MEDIUM

BACKGROUND OF THE INVENTION

1. Field of the Invention

The present invention relates to an image processing apparatus and a control method therefor, as well as a storage medium, and more particularly, to an image processing apparatus, such as a video camera, that detects the face of a subject and performs personal identification of the detected face, and a control method therefor, as well as a storage medium.

2. Description of the Related Art

Recently, there has appeared a video camera provided with a function of personal identification in which a face is periodically detected during image pickup and compared with personal information held in advance to identify whose face it is. In the personal identification function of such a video camera, the face is identified as the face of a particular person if similarity degree calculated by comparison with the personal information is equal to or greater than a threshold set in advance. This video camera is also provided with a function of recording a moving image, attaching information about a person identified during recording of the time-varying image to the moving image. Furthermore, this video camera is provided with a function of classifying the moving image on the basis of the attached information. In the video camera provided with such functions, by specifying a person registered with the personal information, a user can extract only moving images in which the person appears.

In the personal identification function of the video camera, if the threshold for the similarity degree calculated by comparison with the personal information is set low at the time of performing personal identification, the probability of not identifying a person as the person himself (an identity rejection rate) decreases. However, at the same time, the probability of identifying a different person as the above person himself (a different person acceptance rate) rises if the threshold for the similarity degree is set low. Therefore, if the threshold for the similarity degree is set low, a result of misidentification is easily attached during recording of the moving image.

If the threshold for the similarity degree is set high, the different person acceptance rate of misidentifying a different person as a person himself lowers. However, the person himself cannot be identified, and the identity rejection rate rises. Therefore, if the threshold for the similarity degree is set high, it becomes difficult to attach a correct identification result during recording of the moving image. Thus, it is important to adjust the threshold in order to attach a personal identification result to a moving image in such a manner that the usability for a user is improved.

Among conventional face collation apparatuses, there has been proposed an apparatus for adjusting the threshold to obtain an appropriate personal identification result (see Japanese Laid-Open Patent Publication (Kokai) No. 2009-163555, for example). In this conventional face collation apparatus, the threshold is adjusted so that any of the different person acceptance rate, the identity rejection rate, the probability that the different person acceptance rate and the identity rejection rate are equal to each other can be constant irrespective of image pickup conditions such as focus and exposure and registration conditions such as the face size of registered images and the number of registered images. That is, in the conventional face collation apparatus, the threshold is adjusted so that the frequency of being identified as a person himself and the frequency of being wrongly identified are constant among all persons.

In the video camera provided with the function of personal identification, however, it is more desirable that, in the case of searching for a desired person at the time of reproducing a recorded time-varying image, the desired person has been identified with a certain degree of frequency, because the search-ability is greater. However, it is not desirable from the viewpoint of usability that misidentification is increased by giving priority to increase in the identification frequency.

SUMMARY OF THE INVENTION

The present invention provides an image processing apparatus capable of improving the usability in search by, for a person presumed to be difficult to be misidentified, improving the frequency of identifying the person to enhance the search-ability, and a control method therefor, as well as a storage medium.

In an aspect of the invention, there is provided an image processing apparatus comprising an image pickup unit configured to shoot an image; a recording unit configured to record the shot image in a nonvolatile recording medium; a face detection unit configured to detect a face of a person from the shot image; a feature value extraction unit configured to extract a feature value as information about personal appearance from the face of the person; a collation unit configured to calculate the degree of similarity between the feature value of the face of the person extracted by the feature value extraction unit and a feature value of a face of any one of registered persons, each of which has a feature value of a face; an identification unit configured to identify, when the calculated degree of similarity is equal to or greater than a threshold, that the face of the person, of which the feature value is extracted, corresponds to the face of any one of the registered persons; and a display unit configured to display the identification result of the identification unit, wherein the identification unit sets the threshold to a first value before recording of the shot image to the nonvolatile recording medium is started; and sets the threshold to a second value which is greater than the first value, for the face of one of the registered persons who has not been identified at the time of starting the recording of the image, and sets the threshold to a third value which is equal to or greater than the first value and less than the second value, for the face of one of the registered persons who is already identified at the time of starting the recording of the shot image, after the recording of the shot image to the nonvolatile recording medium is started after the display unit has displayed the identification result of the identification unit.

According to the present invention, it is possible to improve the usability in search by, for a person presumed to be difficult to be misidentified, improving the frequency of identifying the person to enhance the search-ability.

Further features of the present invention will become apparent from the following description of exemplary embodiments with reference to the attached drawings.

BRIEF DESCRIPTION OF THE DRAWINGS

FIG. 2 is a view which is useful in explaining a user's personal information list including persons' face images, feature values and names which is registered with the image processing apparatus of FIG. 1 in advance.

FIG. 3 is a flowchart showing the procedure of a face detection/identification process executed by the image processing apparatus of FIG. 1.

FIG. 4 is a view which is useful in explaining a subject list updated in step S302 in FIG. 2.

FIG. 5 is a view which is useful in explaining a result of a collation process executed in step S305 in FIG. 2.

FIGS. 9A to 9D are views which are useful in explaining relationships among the subject list, "already identified person at the time of starting recording", and "identified person", at the time of performing recording with a video camera of FIG. 1.

FIG. 12 is a view which is useful in explaining the result of identification of the person MASAHIRO during the period corresponding to sixteen frames, which is obtained by the collation judgment process of FIGS. 10A and 10B.

DESCRIPTION OF THE EMBODIMENTS

An image processing apparatus according to an embodiment of the present invention is configured by a video camera, and this video camera performs face detection from a shot image and performs personal identification.

Figure 1:
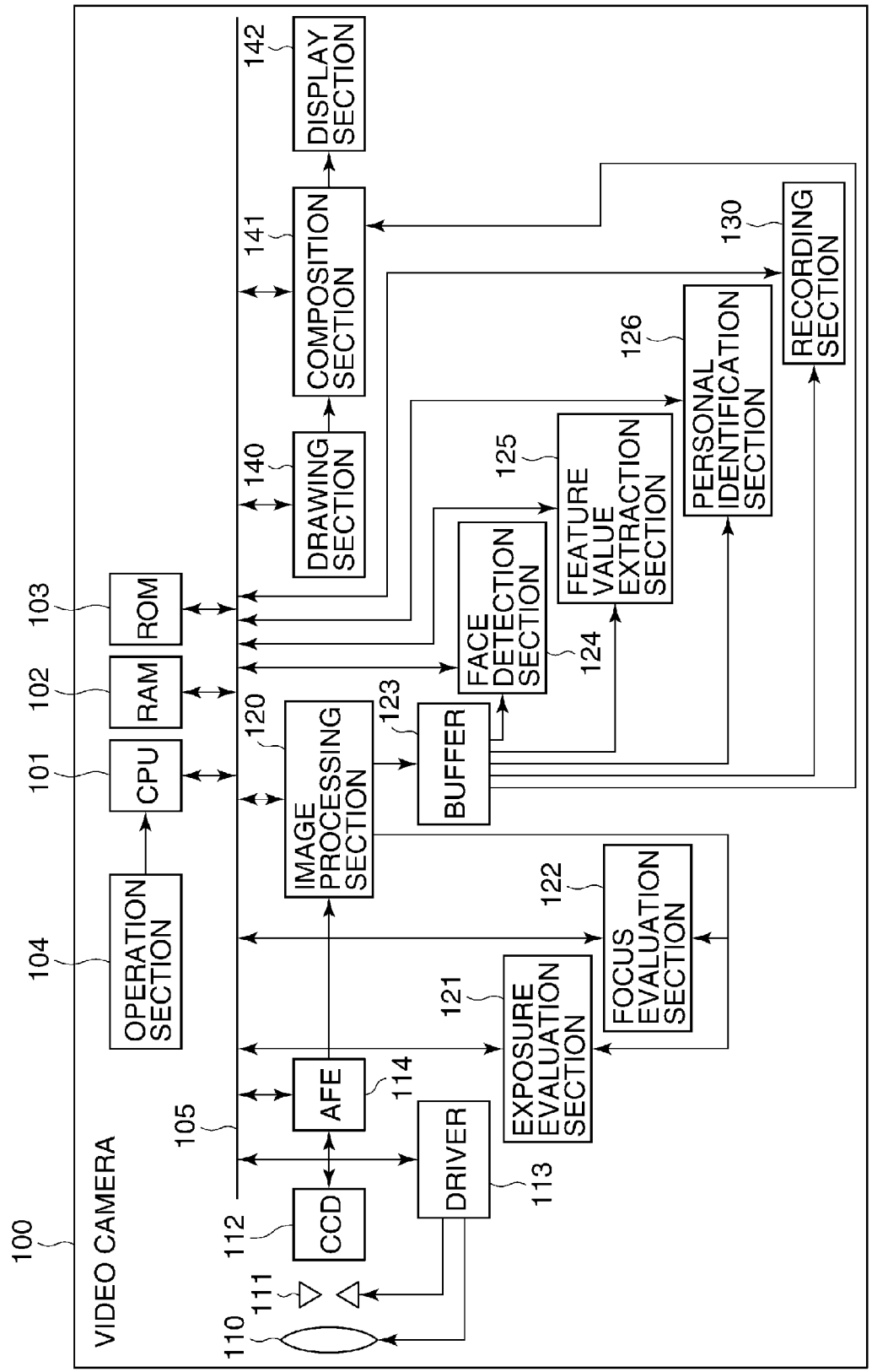
FIG. 1 is a block diagram schematically showing a schematic configuration of an image processing apparatus according to an embodiment of the present invention.

FIG. 1 is a block diagram schematically showing a configuration of the image processing apparatus according to the embodiment of the present invention.

In FIG. 1, a video camera 100 is provided with a CPU 101, a RAM 102, a ROM 103 and an operation section 104 which constitute a control system block.

The CPU 101 is connected to the RAM 102, the ROM 103 and each of other blocks through an internal bus 105, and controls each of the blocks on the basis of a control program stored in the ROM 103. This ROM 103 is configured as a rewritable ROM such as a flash memory.

The CPU 101 uses the RAM 102 as a temporary data storage place when operated. The CPU 101 receives, from the operation section 104, an instruction signal which a user has inputted by operating various operation levers and buttons of the operation section 104, and executes various processes in accordance with the user's instruction.

The video camera 100 is provided with a focus lens 110, an aperture 111, a CCD image sensor 112, a lens driver 113, and an AFE 114 which constitute a camera system block functioning as an image pickup unit for shooting an image.

In the camera system of the video camera 100, when light passes through the focus lens 110 and the aperture 111 to produce an image formed on the image pickup surface of the CCD image sensor 112, the optical image on the image pickup surface is converted to an electrical signal.

In the video camera 100, the CPU 101 controls the lens driver 113 to drive the focus lens 110 and the aperture 111 and adjust focus and an aperture value. In the video camera 100, the AFE 114 drives the CCD image sensor 112 to read an image signal corresponding to one frame every ⅟30 second on the basis of shutter speed specified by the CPU 101 and perform sample holding and amplification of an image signal and conversion to a digital signal.

As shown in FIG. 1, the video camera 100 is provided with an image processing section 120, an exposure evaluation section 121, a focus evaluation section 122, a buffer memory 123, a face detection section 124, a feature value extraction section 125, and a recording section 130 which constitute an image processing system block. This feature value extraction section 125 functions as a feature value extraction unit for extracting a feature value, which is information about personal appearance, from the face of a person.

The image processing section 120 is controlled by the CPU 101 to input an image signal from the AFE 114, perform color conversion processing and output the image signal to the buffer memory 123. The exposure evaluation section 121 and the focus evaluation section 122 evaluate the state of exposure and the state of focus, respectively, for multiple areas included in an image signal obtained from the image processing section 120. Furthermore, the face detection section 124 functions as a face detection unit for detecting the face of a person from a shot image. Therefore, the face detection section 124 reads out an image signal from the buffer memory 123 for each one frame and detects the number of faces of persons included in the image, and the sizes and positions of the faces. Then, the CPU 101 stores the positions and sizes of the faces detected by the face detection section 124 into the RAM 102 as a subject list to be described later.

The feature value extraction section 125 reads out an image signal from the buffer memory 123 and performs an extraction process for extracting, for the faces detected by the face detection section 124, a feature value indicating personal appearance including positions of organs of a face, such as eyes, a nose and a mouth, skin color, and the like, from the subject list.

In the video camera 100, a personal identification section 126 collates the feature values extracted by the feature value extraction section 125 and the feature values of persons registered with the personal information list stored in the ROM 103 (registered persons) and calculates the degree of similarity with each of the persons. That is, the personal identification section 126 functions as a collation unit for calculating the degree of similarity between the feature value of the face of a person extracted by the feature value extraction section 125 and the feature values of face images of the registered persons. Here, the personal information list has listed up thereon face images, feature values and names of persons whom the user registered in advance. Moreover, the personal information list may be stored in a personal computer or a server to which the video camera 100 may be accessed to read the feature values as needed.

In the video camera 100, the CPU 101 executes a collation process for storing the calculated similarity degree into the RAM 102 as a collation result list. It should be noted that the collation result list will be described later. Furthermore, the CPU 101 compares the calculated similarity degree in accordance with the collation result list with a threshold and judges whether the detected face is to be identified as the face of a particular person. That is, if the calculated similarity degree is equal to or greater than the threshold, the CPU 101 functions as an identification unit for judging that a person indicated by the feature value of the face used for calculation of the similarity degree is a person indicated by the feature value of a registered person which has been similarly used for calculation of similarity degree and identifying the person.

The recording section 130 is internally provided with a nonvolatile semiconductor memory not shown. If the user performs an operation of starting recording, the recording section 130 reads an image signal from the buffer memory 123 and records it to the nonvolatile semiconductor memory in the recording section 130. The recording section 130 which functions as a recording unit for recording an image to a recording medium also records an identification result at that time together with the image. Furthermore, if the user performs an operation of stopping recording, the recording section 130 stops recording to the nonvolatile semiconductor memory in the recording section 130. It should be noted that the recording section 130 may store an image signal into an internal hard disk drive (HDD) or a DVD or CD fitted from the outside instead of the nonvolatile semiconductor memory.

The video camera 100 is provided with a drawing section 140, a composition section 141 and a display section 142 which constitute a display system block. The drawing section 140 draws a frame so as to coincide with the face position of an image in accordance with the subject list. If a person is identified as the person, the name of the person is drawn on the upper left of the frame and outputs the frame to the composition section 141. The composition section 141 combines the frame outputted from the drawing section 140 with an image signal while reading out the image signal from the buffer memory 123, and outputs the image signal to the display section 142. The video camera 100 is provided with the display section 142, and the display section 142 outputs the image signal composed by the composition section 141. That is, this display section 142 functions as a display unit for displaying information about a person identified as a particular person, which is a result of identification by the identification unit for personal identification.

FIG. 2 is a view which is useful in explaining the user's personal information list including persons' face images, feature values and names which is registered with the image processing apparatus of FIG. 1 in advance.

In the personal information list shown in FIG. 2, a registration number is information indicating what position the element is positioned in the list. In this specification, the n-th element in the list is expressed as an element [n].

In the case of adding personal information about a new person to this personal information list, the user registers an image showing the face of the person to be added and the name of the person to be added, with the ROM 103. For the registration, the user operates buttons of the operation section 104 to input the name of the person to be added. When finishing input of the name to be added, the CPU 101 extracts a feature value from the registered face image, by the feature value extraction section 125, adds a new element to the personal information list, and stores the name and the feature value. The CPU 101 completes registration with the personal information list by setting and writing what position the added element is positioned, in a registration number field.

FIG. 3 is a flowchart showing the procedure of a face detection/identification process executed by the image processing apparatus of FIG. 1. The process of FIG. 3 is executed by the CPU 101.

In FIG. 3, the face detection/identification process starts when the user performs a recording pause operation before starting recording, on the video camera 100. It should be noted that recording means to control the camera system block and the image processing system block to record a shot image to a nonvolatile memory for the purpose of storage. In comparison, recording pause means a state of controlling the camera system block and the image processing system block without recording a shot image to the nonvolatile memory. That is, though the recording pause and the recording pause are different from each other in whether or not the recording section 130 causes an image signal to be recorded in a nonvolatile memory, the camera system block, the image processing system block and the display system block except the recording section 130 perform similar processes in the recording pause and the recording pause.

When the face detection/identification process starts, the face detection section 124 executes a face detection process (step S301). Next, a pursuit judgment process is performed on the basis of a detection result and positions and sizes in the subject list, and the subject list is updated (step S302).

It should be noted that this subject list is configured as illustrated in FIG. 4. This subject list is stored in the RAM 102, and it is a list for managing information about faces detected by the face detection section 124. In this subject list, numbers, central positions and sizes of the detected faces are stored. The "number" shown in FIG. 4 is information indicating what position the element is positioned in the list.

In this pursuit judgment executed in the step S302, it is judged, from mutual relation between the position and size of a face detected by the face detection section 124 and the position and size of a face stored in the subject list, whether or not the faces are of the same person. If it is judged that the faces are of the same person, the position and size of the face are updated, whereas if it is not judged that the faces are of the same person, the face is added to the subject list as a new element. An element which does no have mutual relation with a detection result and hence has not been updated is deleted from the subject list.

Next, an identification execution judgment process is performed in accordance with the subject list (step S303). In this identification execution judgment process, it is first judged whether there is a person who is a registered with the personal information list and has not been identified yet. It should be noted that, if all the registered persons have been identified, it is not necessary to perform the subsequent process for identification from steps S304 to S307. Furthermore, the CPU 101 judges whether there is an element which has not been identified, in the subject list. It should be noted that, in this face detection/identification process, the process for identification is not performed any more for an element which has already been identified.

Next, if there is an element which has not been identified yet in the subject list, an extraction process is performed for the unidentified element (step S304). In this extraction process, the feature value extraction section 125 extracts the feature value of the element.

Next, a collation process is performed (S305). In this collation process, the personal identification section 126 collates the feature value extracted by the extraction process with the feature value of each registered person, and stores calculated similarity degree (a collation result) into the collation result list. This collation result list is configured as illustrated in FIG. 5, and it stores the similarity degree of each element for which the collation process has been performed, with each registered person.

Next, a collation judgment process of FIGS. 6A and 6B, described hereinafter, is performed for the unidentified element in the subject list (step S306). In this collation judgment, one similarity degree is selected from among the similarity degrees of the element targeted by the collation judgment process with the registered persons, and it is judged whether or not the selected similarity degree is greater than a threshold. It should be noted that the way of selecting the similarity degree and the threshold will be described later with reference to the flowcharts in FIGS. 6A and 6B.

Then, as a result of the collation judgment process in the step S306, "identification candidate person" and "the number of judgments" for the element in the subject list are updated. Here, the "identification candidate person" is information indicating a registration number in the personal information list, given to such a registered person that the similarity degree has exceeded the threshold in the collation judgment, and "the number of judgments" is information indicating how many times the same registered person has been consecutively judged to be an identification candidate person.

Next, identification judgment is performed for the element for which the collation judgment has been performed (step S307). Here, if "the number of judgments" becomes "3", the element is identified as a registered person. The registration number of the identified person in the personal information list is added to "identified person" stored in the RAM 102. Furthermore, at the time of performing the collation judgment for the element which has not been identified yet, identified persons are eliminated from targets. If nobody has been identified, "0" is stored for the "identified person". Next, when the identification judgment ends, all the elements in the collation result list are deleted, and this face detection/identification process ends.

Figure 6A:
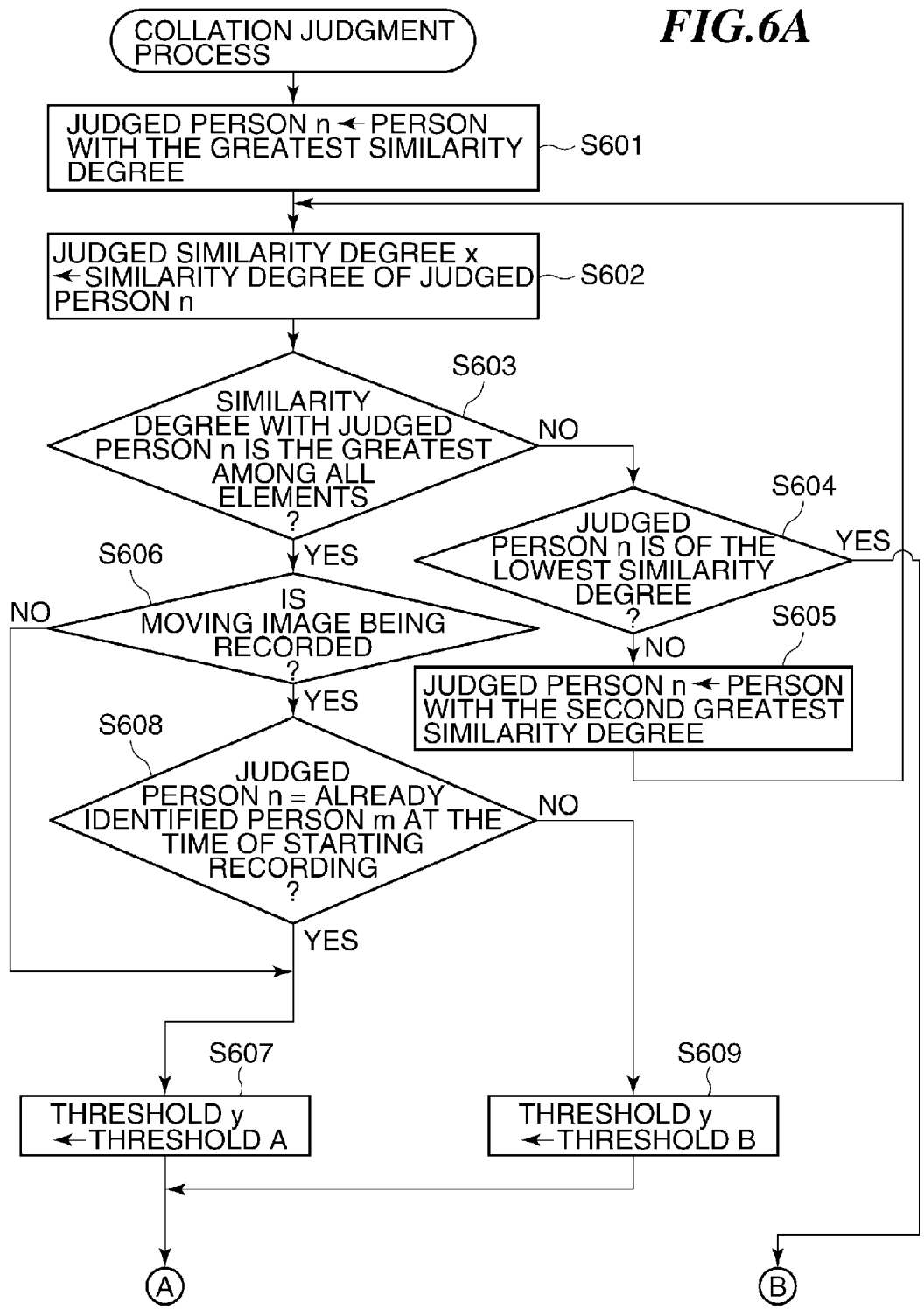
FIGS. 6A and 6B are flowcharts showing the procedure of a collation judgment process executed in step S306 in FIG. 2.
Figure 6B:
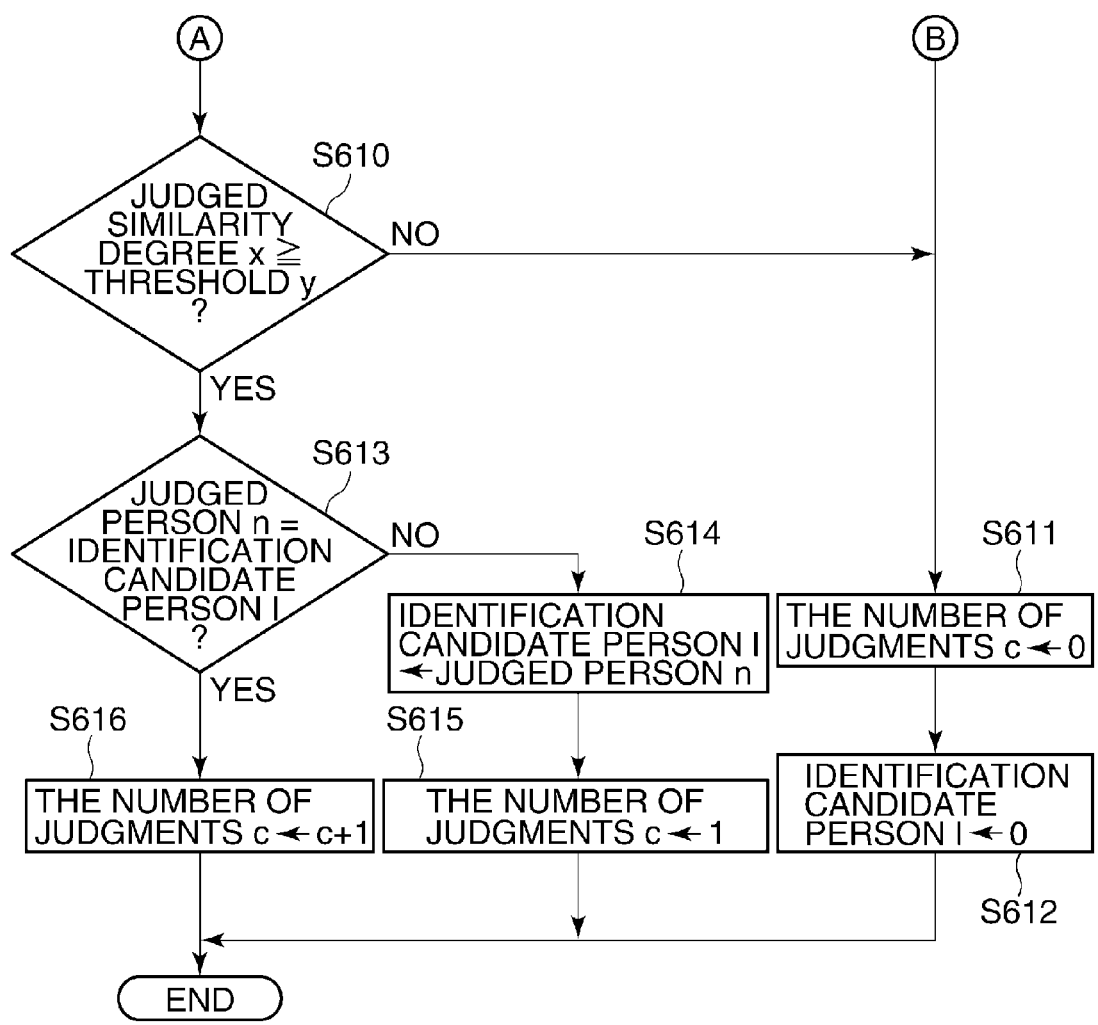

FIGS. 6A and 6B are flowcharts showing the procedure of the collation judgment process executed in the step S306 in FIG. 3.

The collation judgment process of FIGS. 6A and 6B updates the subject list for selection of the similarity degree and control of the threshold. This process is executed by the CPU 101.

In FIG. 6A, a processing operation for selection of the similarity degree is performed (steps S601 to S606).

Specifically, the registration number of such a registered person that the degree of similarity with an element to be collation-judged in the collation result list is the greatest is set as a judged person n (step S601), and the similarity degree of the judged person n is set as a judged similarity degree x (step S602).

Next, it is determined whether or not the judged similarity degree x is the greatest in comparison with the similarity degrees of other elements with the judged person n (step S603).

As a result of the determination of the step S603, if there is another element with a greater degree of similarity with the judged person n than the judged similarity degree x (NO to the step S603), it is determined whether or not the judged person n is of the lowest degree of similarity with the element (step S604).

As a result of the determination of the step S604, if the judged person n is not of the lowest similarity degree (NO to the step S604), a person having the second greatest similarity degree is set as the judged person n (step S605), followed by the process repeating the step S602 et seq.

As a result of the determination of step S604, if the judged person n is of the lowest similarity degree (YES to the step S604), it is judged that none of the degrees of similarity with all the registered persons satisfies the condition of the step S603 with a similar person, the number of judgments c is reset to "0" (step S611), an identification candidate person 1 is set to "0" (step S612), followed by terminating the process.

As a result of the determination of the step S603, if the judged similarity degree x is the greatest in comparison with the similarity degrees of the other elements with the judged person n (YES to the step S603), a threshold y used for identification is changed as the condition demands.

In this threshold changing process, it is determined first whether a moving image is being recorded or not (step S606). If it is determined that recording of the moving image has not been started yet (NO to the step S606), a relatively low threshold A is set for the threshold y (step S607). Here, the value range of the similarity degree of the personal identification section 126 is assumed to be from 0 to 100, and, for example, the threshold A is assumed to be 80.

As a result of the determination of the step S606, the moving image is being recorded (YES to the step S606), it is determined whether or not the judged person n is an already identified person m at the time of starting recording (step S608). Here, the already identified person m at the time of starting recording is a person identified by information indicating the registration number of an already identified person at the time of starting recording of the moving image, which is stored in the RAM 102. It should be noted that, when recording of the moving image is started by a button operation by the user in a recording pause state before starting the recording, the registration number of a person who is already identified then is stored before the face detection section 124 is caused to operate. If nobody has been identified, "0" is stored. When the recording ends, the "the already identified person at the time of starting recording" is cleared to "0".

As a result of the determination of the step S608, if the judged person n corresponds to the already identified person m at the time of starting recording m (YES to the step S608), the threshold A is set for the threshold y (step S607), whereas if the judged person n does not correspond to the already identified person m at the time of starting recording m (NO to the step S608), a threshold B greater than the threshold A is set for the threshold y (step S609). Here, the threshold B is set to, for example, "90".

Next, it is determined whether or not the judged similarity degree x is less than the threshold y (step S610). If the judged similarity degree x is less than the threshold y (NO to the step S610), it is judged that there is no similar registered person, and hence the "identification candidate person" in the subject list is updated to "0" (step S611), subsequently the identification candidate person 1 is set to "0" (step S612), followed by terminating the process.

Next, as a result of the determination of the step S610, the judged similarity degree x is equal to or greater than the threshold y (YES to the step S610), it is determined whether or not the judged person n corresponds to the identification candidate person 1 (step S613).

As a result of the determination of the step S613, the judged person n does not correspond to the identification candidate person 1 (NO to the step S613), identification for the registered person is to be new. Therefore, the identification candidate person 1 is updated to the judged person n (step S614). Next, "the number of judgments" is updated to "1" (step S615), followed by terminating the process.

As a result of the determination of the step S613, the judged person n corresponds to the identification candidate person 1 (YES to the step S613), the number of judgments is counted up (step S616), followed by terminating the process.

Moreover, in the collation judgment process of FIGS. 6A and 6B, a description has been made on a case where the threshold A is used as the threshold at the time of performing the collation judgment process, for an already identified person at the time of starting recording. However, this threshold may comprise a threshold C which is equal to or greater than the threshold A and less than the threshold B. The value of this threshold C may be determined with the use of the similarity degree during a sampling period until identification and before starting recording (in a recording pause state). For example, if the degrees of similarity with the same registered person before identification are 85, 83, and 88 with the similarity degree exceeding the threshold A consecutively three times, the lowest value 83 is used as the threshold C.

As described above, in the collation judgment process of FIGS. 6A and 6B, the identification is positively performed in the recording pause state before starting recording. This is because the user is expected to desire to start recording of the moving image after having correctly identified a person in the recording pause state before starting the recording and subsequently give a result of the identification to the moving image. Therefore, in the video camera 100, the threshold is set relatively low to increase the opportunities of being identified. Furthermore, even in the case of misidentification, displaying a result of the identification prevents the user from starting recording of the moving image without knowing the misidentification.

As for an already identified person at the time of starting recording, there is a strong possibility that the user has started the recording after having confirmed display of an identification result, and accordingly, the identification result is assumed to be correct. Therefore, as for the "already identified person at the time of starting recording (in a recording pause state before starting the recording)", there may be a strong possibility that he is correctly identified thereafter even if the threshold is set low as it is, which makes the state of being easily identified to be continued even after having started the recording. As for other persons, however, since there is no clear reason for regarding an identification result as correct, the threshold is set high to give priority to prevention of misidentification.

In the collation judgment process of FIGS. 6A and 6B, a threshold used for the already identified person at the time of starting recording with the use of the similarity degree before being identified is calculated after the recording has been started, which suppresses the possibility of a different person being misidentified because of lowering the threshold unnecessarily too much.

Next, a specific operation performed in the case of starting recording, taking an image of a person registered with a personal information list with the video camera 100 will be described with reference to FIGS. 7 and 8. This operation is executed by the CPU 100.

Here, a description will be made on a case where a personal information list stored in the ROM 103 in the video camera 100 of FIG. 1 is similar to that of FIG. 2. In the illustration in FIGS. 7 and 8, a frame (frame 1) in which "SATOSHI", a person of a registration number 1 in the personal information list, is framed in and his face is detected first by the face detection section 124, is regarded as a reference frame.

The face of the person "SATOSHI" is detected by the face detection section 124 during the period from the frame 1 to a frame 8, is once not detected in frames 9 and 10, and is detected again in frames 11 to 16.

In the frame 8, a person "MASAHIRO" of a registration number 2 in the personal information list is framed in and his face is detected by the face detection section 124. The person "MASAHIRO" is continuously detected by the face detection section 124 after the frame 8 et seq. It is assumed that, during the period corresponding to the sixteen frames, the user does not start recording in and before the frame 4, starts recording in the frame 5 and continues the recording thereafter.

Figure 7:
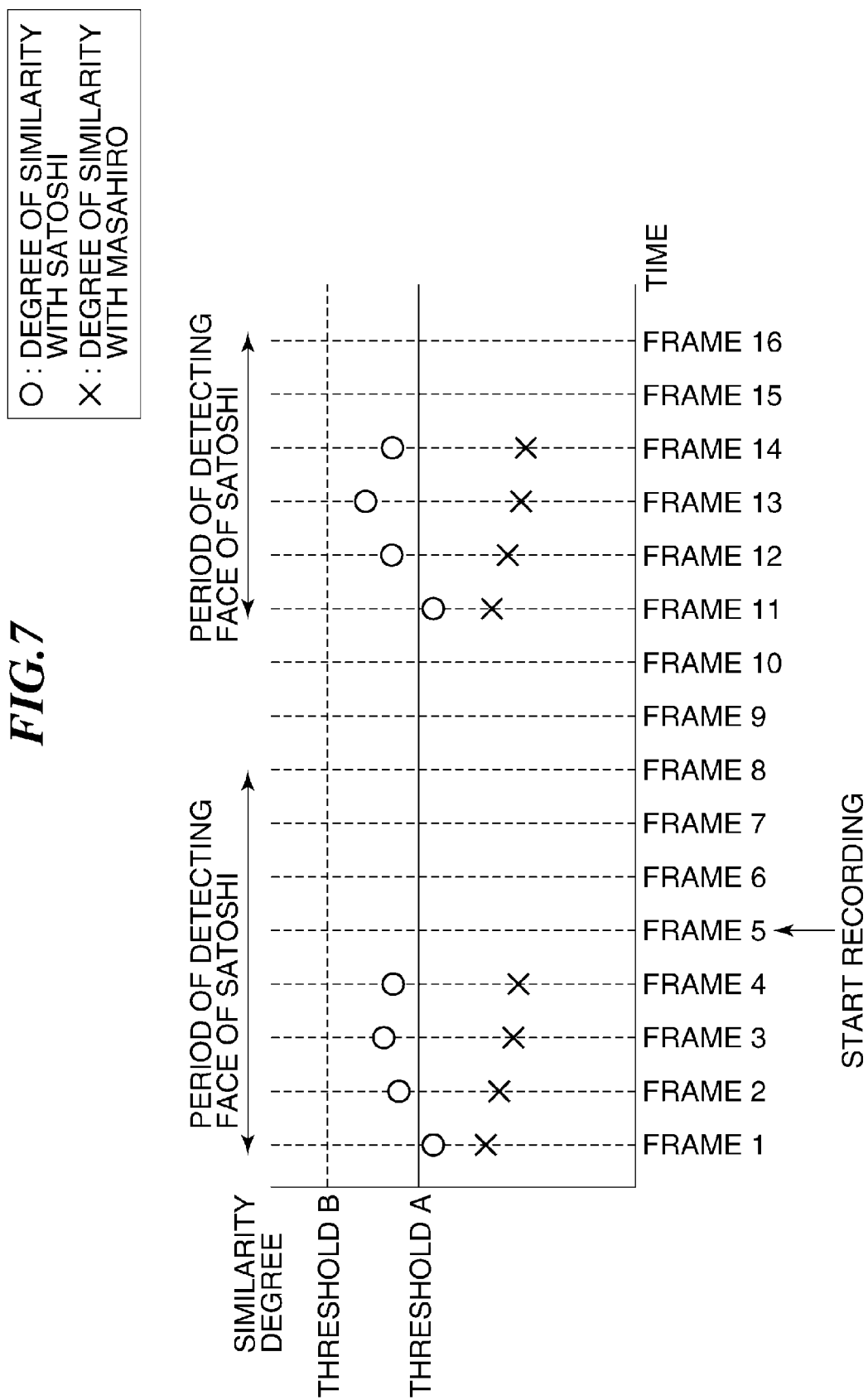
FIG. 7 is a view which is useful in explaining the result of identification of a person "SATOSHI" during a period corresponding to sixteen frames, which is obtained by the collation judgment process of FIGS. 6A and 6B.
Figure 8:
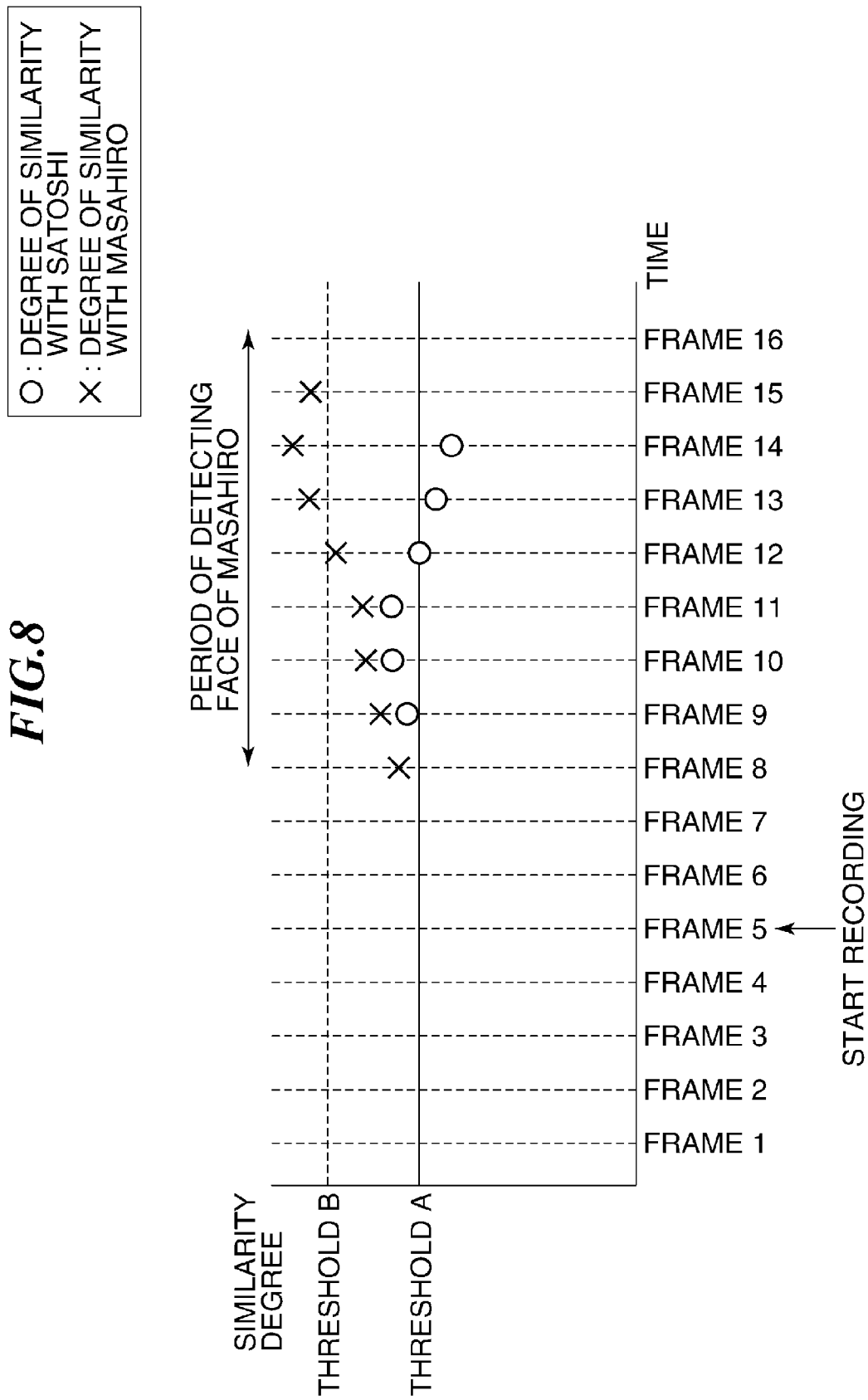
FIG. 8 is a view which is useful in explaining the result of identification of a person "MASAHIRO" during the period corresponding to sixteen frames, which is obtained by the collation judgment process of FIGS. 6A and 6B.

FIGS. 7 and 8 illustrate a result of collation by the personal identification section 126 for "SATOSHI" and "MASAHIRO" during the period corresponding to the sixteen frames.

In the frame 1 shown in FIG. 7, the face detection section 124 detects the face of "SATOSHI", adds an element (an element [1]) to the subject list, and stores a position and size on the basis of the detection result.

Next, since none of the registered persons has been identified and the element [1] has not been identified as the result of the identification execution judgment process, the element [1] satisfies the conditions, which enables the extraction process and the collation process to be performed, and the collation result list is updated.

As shown in FIG. 7, since the degree of similarity with the registered person "SATOSHI" is the greatest among the degrees of similarity with the element [1] in the collation result list as the result of the collation judgment process, this similarity degree is compared with a threshold. As the threshold then is used as the threshold A, since the period corresponding to the frames 1 to 4 is before starting recording (in the recording pause state before starting the recording).

Next, since the similarity degree is less than the threshold A in the frame 1, "0" is stored for "the number of judgments" for the element [1] corresponding to "SATOSHI" in the subject list, and "0" is stored for the "identification candidate person". It should be noted that, since the number of identifications is "0", the CPU 101 does not identify the element [1] in the identification judgment.

Next, in the frame 2, it is judged, from a result of detection by the face detection section 124, that the detected face is the same as the face of the element [1] by the pursuit judgment process, the position and size of the element [1] in the subject list is updated. Similarly to the case of the previous frame, since the element [1] satisfies the conditions for the identification execution judgment process, the extraction process and the collation process are performed, and the collation result list is updated.

Next, the degree of similarity with the registered person "SATOSHI" is compared with the threshold A by the collation judgment process similarly to the case of the frame 1 shown in FIG. 7. Since the similarity degree exceeds the threshold A in the frame 2, the CPU 101 stores the registration number 1 of the registered person "SATOSHI" for the "identification candidate person" for the element [1] in the subject list and stores "1" for "the number of judgments".

Next, in the frames 3 and 4 also, the CPU 101 updates the position and size of the element [1] in the subject list by performing the pursuit judgment process on the basis of a result of detection by the face detection section 124. Similarly to the case of the previous frame, since the element [1] satisfies the conditions for the identification execution judgment process, the extraction process and the collation process are performed, and the collation result list is updated.

Next, in the collation judgment process, when the degree of similarity with the registration person "SATOSHI" is compared with the threshold A, the similarity degree exceeds the threshold A in both of the frames 3 and 4 as shown in FIG. 7. Since the judged person corresponds to the identification candidate person, the number of judgments is counted up. At this time, since the number of judgments is "3" in the identification judgment of the frame 4, the CPU 101 identifies the element [1] as the registered person "SATOSHI", and adds the registration number 1 of the registered person "SATOSHI" to the "identified person". As for this frame 4, the subject list, the "already identified person at the time of starting recording" and the "identified person", which have been already updated, are as shown in (A), (B) and (C) of FIG. 9A.

Next, the drawing section 140 draws "SATOSHI", the name of the identified person, subsequently, at the time of starting recording in the frame 5, the registration number 1 of the identified registered person "SATOSHI" is stored for the "already identified person at the time of starting recording". Then, the pursuit judgment process is performed with the use of the detection result obtained by the face detection section 124 performing the detection process, and the position and size of the element [1] in the subject list are updated. At this time, in the identification execution judgment process, since the element [1] is already identified and does not satisfy the conditions, the subsequent process is not performed. As for this frame 5, the subject list, the "already identified person at the time of starting recording", and the "identified person", which have been already updated, are as shown in (A), (B) and (C) of FIG. 9B.

Next, in the frames 6 and 7, the pursuit judgment process is executed on the basis of the result of detection by the face detection section 124, and the position and size of the element [1] in the subject list are updated. Here, similarly to the case of the previous frame, since the element [1] does not satisfy the conditions for the identification execution judgment, the subsequent process is not performed.

Next, in the frame 8, "MASAHIRO" is framed in as shown in FIG. 8. The pursuit judgment process is performed on the basis of the result of detection by the face detection section 124, the position and size of the element [1] in the subject list are updated, and further, a new element (an element [2]) corresponding to "MASAHIRO" is added. Similarly to the case of the previous frame, since the element [1] does not satisfy the conditions for the identification execution judgment, the subsequent process is not performed. Since the element [2] has not been identified and satisfies the conditions, the CPU 101 performs the extraction process and the collation process only for the element [2] and updates the collation result list.

Next, in the collation judgment process, the degree of similarity with "MASAHIRO" is used between the degrees of similarity with the element [2] in the collation result list shown in FIG. 5 because the registered person "SATOSHI" is an identified person. At this time, as the threshold for the collation judgment process is used the threshold, since the moving image is being recorded and the judged person does not correspond to the already identified person at the time of starting recording.

Next, in the frame 8, since the similarity degree is less than the threshold B, "0" is stored for "the number of judgments" for the element [2] corresponding to "MASAHIRO" in the subject list, and "0" is stored for the "identification candidate person". Here, since the number of identifications is "0", the element [2] is not identified in the identification judgment.

Next, the face of "SATOSHI" cannot be detected in the frame 9. The pursuit judgment process is performed on the basis of the result of detection by the face detection section 124, the element [1] corresponding to "SATOSHI" is deleted and the position and size of the element [2] in the subject list are updated. Furthermore, the registration number of the registered person "SATOSHI" is deleted from the "identified person". Similarly to the case of the previous frame, since the element [2] satisfies the conditions for the identification execution judgment, the extraction process and the collation process are performed, and the collation result list is updated.

Next, in the collation judgment process, the degree of similarity with the registered person "MASAHIRO" is compared with the threshold B similarly to the case of the frame 8, as shown in FIG. 8. Here, since the similarity degree is less than the threshold, "the number of judgments" and "identification candidate person" for the element [2] continue to be "0". In the identification judgment process, the identification is not performed as is the case with the previous frame. For this frame 9, the subject list, the "already identified person at the time of starting recording" and the "identified person", which have been already updated, are as shown in (A), (B) and (C) of FIG. 9C.

Next, in the frame 10, the pursuit judgment process executed on the basis of the result of detection by the face detection section 124, and the position and size of the element [2] in the subject list are updated. As is the case with the previous frame, the element [2] satisfies the conditions for the identification execution judgment; accordingly, the extraction process and the collation process are performed, and the collation result list is updated.

Next, in the collation judgment process, the degree of similarity with the registered person "MASAHIRO" is compared with the threshold B as is the case with the frame 8, as shown in FIG. 8. This similarity degree is less than the threshold; accordingly, "the number of judgments" and "identification candidate person" for the element [2] continue to be "0".

Next, in the frame 11, the pursuit judgment process is executed on the basis of the result of detection by the face detection section 124, and hence the position and size of the element [2] in the subject list are updated. Furthermore, since the face of "SATOSHI" can be detected again, the CPU 101 adds a new element (an element [3]) corresponding to "SATOSHI". As is the case with the previous frame, the element [2] satisfies the conditions for the identification execution judgment, and the element [3] also satisfies the conditions. Therefore, the extraction process and the collation process are performed for the elements [2] and [3], and the collation result list is updated.

Next, in the collation judgment process for the element [2], the degree of similarity with the registered person "MASAHIRO" is compared with the threshold B as shown in FIG. 8. Here, the similarity degree is less than the threshold B; accordingly, "the number of judgments" and "identification candidate person" for the element [2] continue to be "0".

Next, the collation judgment process is performed for "SATOSHI" corresponding to the element [3]. Since the degree of similarity with the registered person "SATOSHI" is the greatest as shown in FIG. 7, this similarity degree is compared with the threshold. At this time, since the "judged person" corresponds to the already identified person at the time of starting recording, as the threshold is used the threshold A.

Next, in the frame 11, since the similarity degree is less than the threshold A, "0" is stored for the "number of judgments" for the element [3] corresponding to "SATOSHI" in the subject list, and "0" is stored for the "identification candidate person".

Next, in the frame 12, the pursuit judgment process is executed on the basis of the result of detection by the face detection section 124, and the positions and sizes of the elements [2] and [3] in the subject list are updated. As is the case with the previous frame, the elements [2] and [3] satisfy the conditions; accordingly, the CPU 101 executes the extraction process and the collation process and causes the collation result list to be updated.

Next, in the collation judgment process for the element [2], the degree of similarity with the registered person "MASAHIRO" is compared with the threshold B as shown in FIG. 8. Here, the similarity degree is less than the threshold B; accordingly, "the number of judgments" and "identification candidate person" for the element [2] continue to be "0".

Next, the collation judgment is performed for "SATOSHI" corresponding to the element [3]. As is the case with the previous frame, the degree of similarity with the registered person "SATOSHI" is compared with the threshold A as shown in FIG. 7. In this frame 12, the similarity degree exceeds the threshold A; accordingly, the registration number 1 of the registered person "SATOSHI" is stored for the "identification candidate person" for the element [3] in the subject list, and "1" is stored for "the number of judgments".

Next, in the frame 13, the pursuit judgment process is executed on the basis of the result of detection by the face detection section 124, and the positions and sizes of the elements [2] and [3] in the subject list are updated. As is the case with the previous frame, since the elements [2] and [3] satisfy the conditions; accordingly, the extraction process and the collation process are performed, and the collation result list is updated.

Next, in the collation judgment process for the element [2], the degree of similarity with the registered person "MASAHIRO" is compared with the threshold B as shown in FIG. 8. Here, the similarity degree exceeds the threshold B; accordingly, the registration number 2 of the registered person "MASAHIRO" is stored for the "identification candidate person" for the element [2] in the subject list, and "1" is stored for "the number of judgments".

Next, the collation judgment process is performed for "SATOSHI" corresponding to the element [3]. As shown in FIG. 7, the CPU 101 compares the degree of similarity with the registered person "SATOSHI" with the threshold A. Here, the similarity degree exceeds the threshold A; accordingly, the CPU 101 judges that the judged person corresponds to the identification candidate person and counts up the number of judgments for the element [3] in the subject list to "2".

Next, in the frame 14, the pursuit judgment process is executed on the basis of the result of detection by the face detection section 124, and the positions and sizes of the elements [2] and [3] in the subject list are updated. As is the case with the previous frame, the elements [2] and [3] satisfy the conditions; accordingly, the extraction process and the collation process are performed, and the collation result list is updated.

Next, in the collation judgment process for the element [2], the degree of similarity with the registered person "MASAHIRO" is compared with the threshold B as shown in FIG. 8. Here, since the similarity degree exceeds the threshold B, and the judged person corresponds to the identification candidate person, the number of judgments for the element [2] in the subject list is counted up to "2".

Next, the collation judgment process is performed for "SATOSHI" corresponding to the element [3]. As shown in FIG. 7, the degree of similarity with the registered person "SATOSHI" is compared with the threshold A. Here, since the similarity degree exceeds the threshold A and the judged person corresponds to the identification candidate person, the number of judgments for the element [3] in the subject list is counted up to "3". At this time, the number of judgments is "3" in the identification judgment; accordingly, the element [3] is identified as the registered person "SATOSHI", and the registration number 1 of the registered person "SATOSHI" is added to the "identified person". Then, "SATOSHI", the name of the identified person is caused to be drawn by the drawing section 140.

Next, in the frame 15, the pursuit judgment process is executed on the basis of the result of detection by the face detection section 124, and the positions and sizes of the elements [2] and [3] in the subject list are updated. Though the element [2] satisfies the conditions as is the case with the previous frame; accordingly, the element [3] has been identified. Therefore, the extraction process and the collation process are performed for "MASAHIRO" corresponding to the element [2], and the collation result list is updated.

Next, in the collation judgment process for the element [2], the degree of similarity with the registered person "MASAHIRO" is compared with the threshold B as shown in FIG. 8. Here, since the similarity degree exceeds the threshold B and the judged person corresponds to the identification candidate person, the number of judgments for the element [2] in the subject list is counted up to "3". At this time, the number of judgments is 3 in the identification judgment; accordingly, the element [2] is identified as the registered person "MASAHIRO", and the registration number 2 of the registered person "MASAHIRO" is added to the "identified person". Then, the drawing section 140 is controlled to draw "MASAHIRO", the name of the identified person. As for this frame 15, the subject list, the "already identified person at the time of starting recording" and the "identified person", which have been already updated, are as shown in (A), (B) and (C) of FIG. 9D.

Next, in the frame 16, the pursuit judgment process is executed on the basis of the result of detection by the face detection section 124, and the positions and sizes of the elements [2] and [3] in the subject list are updated. At this time, all the registered persons have been identified and do not satisfy the conditions for the identification execution judgment; accordingly, the extraction process and the collation process are not performed for any one of the elements.

Thus, the identification is performed with a low threshold before starting the recording (in a recording pause state before starting the recording), and the already identified person at the time of starting the recording is continuously identified with the low threshold. Furthermore, a person who has not been identified at the time of starting the recording is identified with a threshold greater than the threshold for the person who is already identified. In the case of performing the identification in this way, even lowering the threshold increases the opportunities of such a person, who has a strong possibility of being correctly identified, being identified, to decrease the rate of other persons being misidentified, which improves the person search-ability using the recorded identification information.

Figure 10A:
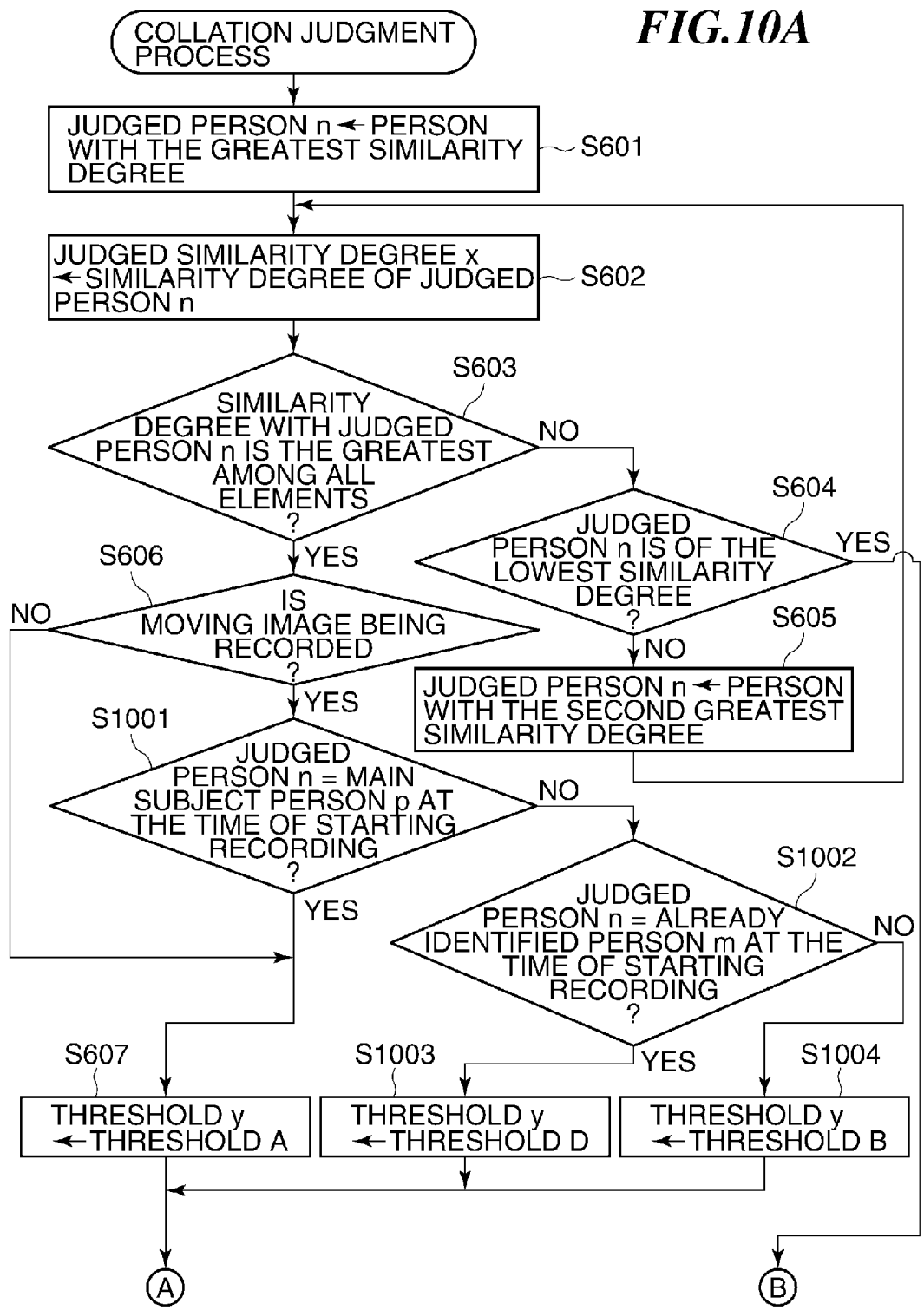
FIGS. 10A and 10B are flowcharts showing the procedure of a variation of the collation judgment process of FIGS. 6A and 6B.
Figure 10B:
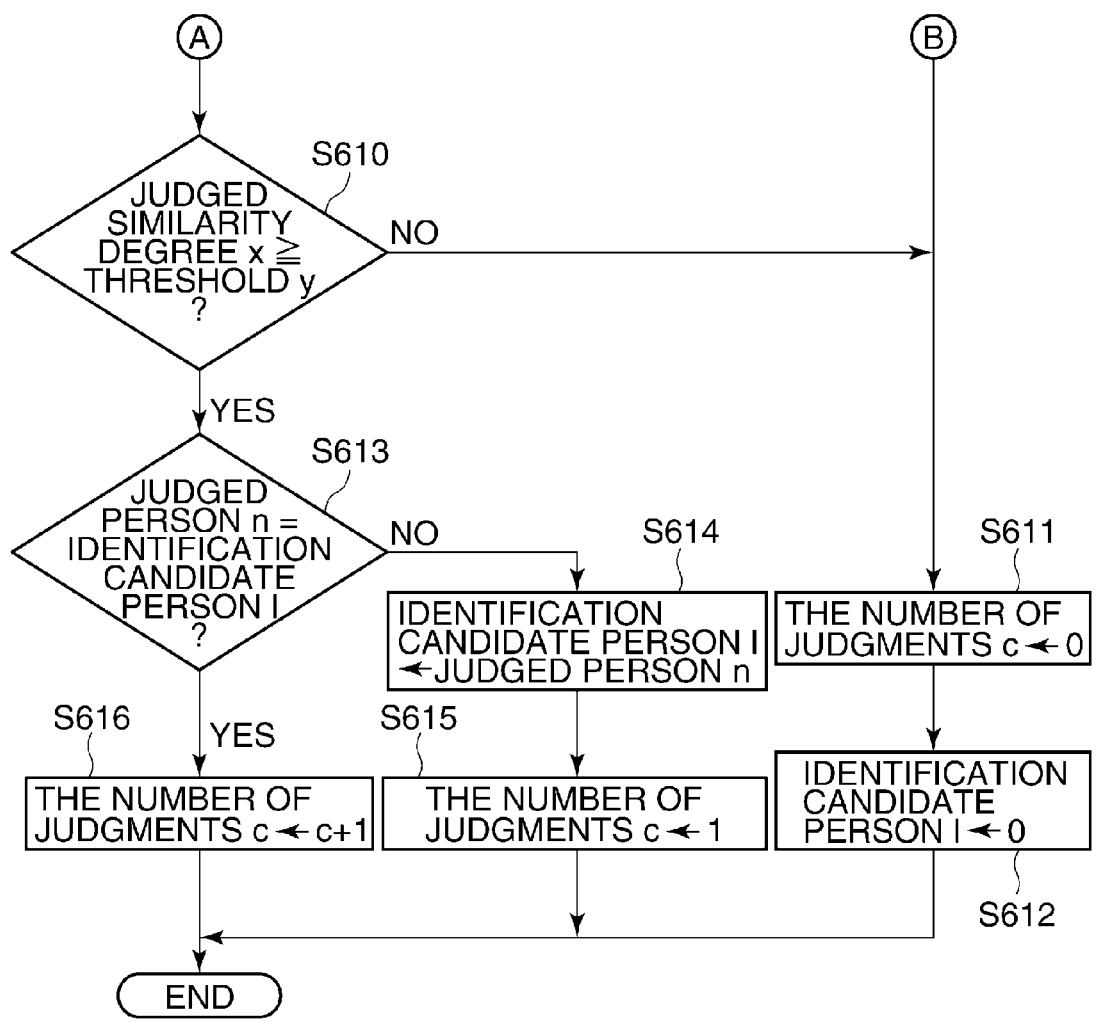

FIGS. 10A and 10B are flowcharts showing the procedure of a variation of the collation judgment process of FIGS. 6A and 6B.

The collation judgment process of FIGS. 10A and 10B is a modification of, in the collation judgment process of FIGS. 6A and 6B mentioned above, the method of controlling the threshold to be set for the identified person at the time of starting recording. A "main subject" used hereinafter refers to a face with the greatest priority among faces detected by the face detection section 124.

In the collation judgment process of FIGS. 10A and 10B, it can be set whether a desired face is selected as the main subject from among detected faces due to an operation of a button of the operation section 104, any one face is automatically selected as the main subject on the basis of the positions and sizes of the faces detected by the face detection section 124. For example, when it is assumed that a first evaluation value is set greater as the face is larger and a second evaluation value is set greater as the position of the face is nearer to a central part of the image, such a face that the sum of the first evaluation value and the second evaluation value is the largest is selected as the main subject. The number of the face set as the main subject in the subject list is stored in the RAM 102 as main subject information to manage which face the main subject is (a main subject setting unit). When the face set as the main subject is not detected any more, the main subject information is set to "0".

The collation judgment process of FIGS. 10A and 10B is different from the collation judgment process of FIGS. 6A and 6B in the method for judging a person to be set as the already identified person at the time of starting recording.

In the collation judgment process in FIGS. 6A and 6B, the threshold C is used for all registered persons that are already identified at the time of starting recording (the threshold C is set to the same value as the threshold A and is hence handled as the threshold A).

In comparison, in the collation judgment process of FIGS. 10A and 10B, though the threshold C is used for a person, who is already identified as the main subject at the time of starting recording, a threshold D which is greater than the threshold C but is equal to or less than the threshold B is used for a person, who is already identified not as the main subject at the time of starting recording. It should be noted that, as for a person who has not been identified at the time of starting recording, the threshold B is used similarly to the collation judgment process of FIGS. 6A and 6B.

In the collation judgment process of FIGS. 10A and 10B, processes in steps S601 to S607 and steps S610 to S616 are identical with those of the collation judgment process of FIGS. 6A and 6B described before, and therefore description thereof is omitted, with different points mainly described.

In the collation judgment process of FIGS. 10A and 10B, the threshold y used for identification during recording of the moving image is changed under conditions different from those of the collation judgment process of FIGS. 6A and 6B. Therefore, in the step S606 shown in FIG. 10A, if the moving image is being recorded (YES to the step S606), the process proceeds to step S1001, where it is determined whether the judged person n corresponds to a main subject person p at the time of starting recording.

Here, the "main subject person at the time of starting recording" is information stored in the RAM 102 of indicating the registration number of a person, who is already identified as the main subject at the time of starting recording of the moving image. In the collation judgment process of FIGS. 10A and 10B, when recording of the moving image is started by a button operation by the user, the registration numbers of persons who are already identified then are stored for "identified person" at the time of starting the recording before the face detection section 124 is caused to operate. When it is judged that there is the main subject among them on the basis of the main subject information, the registration number of that person is stored as the main subject person at the time of starting recording. If it is judged that the main subject is not set or that the main subject has not been identified, "0" is stored. When this moving image recording ends, the "main subject person at the time of starting recording" is cleared to "0".

As a result of the determination of the step S1001, the judged person n corresponds to the main subject person p at the time of starting recording (YES to the step S1001), the threshold A is set for the threshold y (step S607). The threshold C used for the collation judgment is set to the same value as the threshold A and hence handled as the threshold A. If the judged person n does not correspond to the main subject person p at the time of starting recording (NO to the step S1001), it is determined whether or not the judged person n corresponds to the already identified person m at the time of starting recording (step S1002).

As a result of the determination of step S1002, the judged person n corresponds to the already identified person m at the time of starting recording (YES to the step S1002), the threshold D is set for the threshold y (step S1003). If the judged person n does not correspond to the already identified person m at the time of starting recording (NO to the step S1002), the threshold B is set for the threshold y (step S1004).

According to the collation judgment process of FIGS. 10A and 10B, the threshold is changed to adjust the frequency depending on whether or not a person of which the identification frequency is to be increased after starting recording of the moving image corresponding to a person specified by the user, which enables the user's intension to reflect on the identification result to improve the moving image searchability.

Next, a description will be made of a specific operation performed in the collation judgment process of FIGS. 10A and 10B in a case where the video camera 100 of FIG. 1 starts recording while shooting a person registered with the personal information list, with reference to FIGS. 11 and 12. This operation is executed by the CPU 101.

It is assumed here that the personal information list stored in the ROM 103 of the video camera 100 is similar to that in FIG. 2. The threshold D is set to the same value as the threshold B and hence handled as the threshold B.

It is also assumed that, at the time of starting image pickup, there are shot "SATOSHI", a person of a registration number 1 and "MASAHIRO", a person of a registration number 2, in the personal information list. FIGS. 11 and 12 show results of collation by the personal identification section 126 for "SATOSHI" and "MASAHIRO" during a period corresponding to thirteen frames starting from a frame in which a face is detected by the face detection section 124 first (a frame 1), with the frame 1 as a reference frame.

Figure 11:
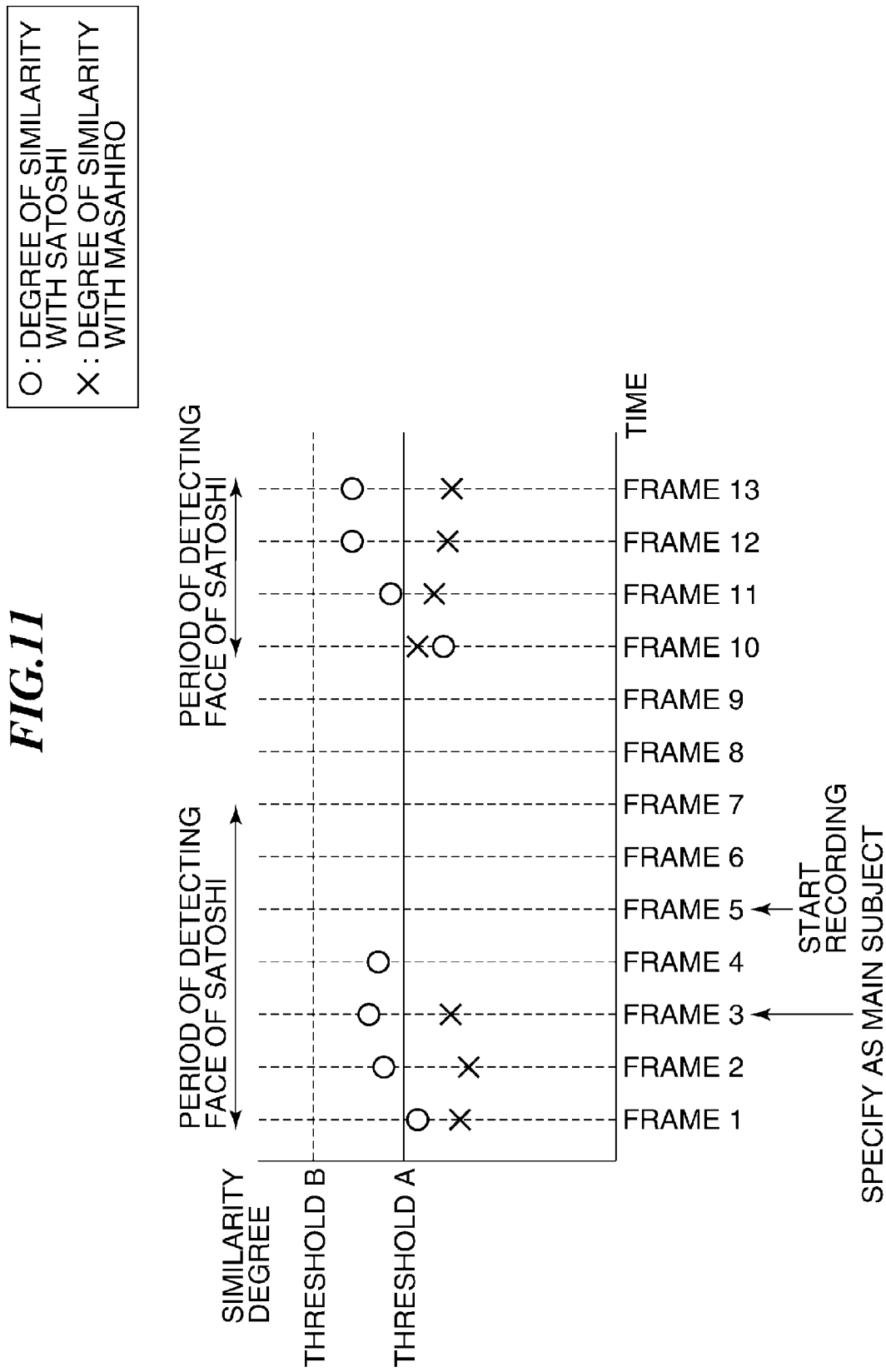
FIG. 11 is a view which is useful in explaining the result of identification of the person "SATOSHI" during a period corresponding to sixteen frames, which is obtained by the collation judgment process of FIGS. 10A and 10B.

As shown in FIGS. 11 and 12, the face of "SATOSHI" for the registration number 1 is detected by the face detection section 124 during the frame 1 to a frame 7, is not detected in frames 8 and 9, and is detected again in frames 10 to 13. Furthermore, in FIGS. 11 and 12, "SATOSHI" is selected as the main subject by the user in the frame 3.

As shown in FIGS. 11 and 12, the face of "MASAHIRO" for the registration number 2 is detected by the face detection section 124 during the frames 1 to 7, and framed out not to be detected in the frame 8 et seq. Here, it is assumed that, during the period corresponding to the thirteen frames, the user does not start recording until the frame 4 et seq., but starts recording in the frame 5 to continue the recording thereafter.

First, in the frame 1, the face detection section 124 detects the faces of "SATOSHI" and "MASAHIRO", adds elements (an element [1] for "SATOSHI" and an element [2] for "MASAHIRO") to the subject list, and stores positions and sizes on the basis of the detection result.

Next, in the identification execution judgment, none of the registered persons has been identified, and hence neither the element [1] nor the element [2] has been identified, the elements [1] and [2] satisfy the conditions; accordingly, the extraction process and the collation process are performed, and the collation result list is updated.

Next, in the collation judgment process for the element [1], since the degree of similarity with the registered person "SATOSHI" is the greatest as shown in FIG. 11, and hence is greater than the degree of similarity of the element [2] with "SATOSHI" as shown in FIG. 12, this similarity degree is compared with a threshold. Since the period corresponding to the frames 1 to 4 is before starting the recording, the threshold A is used as the threshold then.

Since the similarity degree is less than the threshold A in the frame 1, "0" is stored for "the number of judgments" for the element [1] corresponding to "SATOSHI" in the subject list, and "0" is stored for the "identification candidate person". Next, the collation judgment is performed for "MASAHIRO" corresponding to the element [2]. As shown in FIG.

12, the degree of similarity with the registered person "MASAHIRO" is the greatest and hence is greater than the degree of similarity of the element [1] with "MASAHIRO" shown in FIG. 11. Therefore, this similarity degree is compared with the threshold A. Then, since the similarity degree then exceeds the threshold A, the registration number 2 of the registered person "MASAHIRO" is stored for the "identification candidate person" for the element [2] in the subject list, and "1" is stored for "the number of judgments".

Next, in the frame 2, the pursuit judgment process is executed on the basis of the result of detection by the face detection section 124, and the positions and sizes of the elements [1] and [2] in the subject list are updated. As is the case with the previous frame, since the elements [1] and [2] satisfy the conditions, the extraction process and the collation process are performed, and the collation result list is updated.

Next, as shown in FIGS. 11 and 12, the degree of similarity with the registered person "SATOSHI" is compared with the threshold A in the collation judgment process for the element [1]. Then, since the similarity degree exceeds the threshold A, the registration number 1 of the registered person "SATOSHI" is stored for the "identification candidate person" for the element [1], and "1" is stored for "the number of judgments". Next, the collation judgment is performed for "MASAHIRO" corresponding to the element [2]. As shown in FIGS. 11 and 12, the degree of similarity with the registered person "MASAHIRO" is compared with the threshold A as is the case with the previous frame. Here, since the similarity degree exceeds the threshold A, and the judged person corresponds to the identification candidate person, the number of judgments for the element [2] in the subject list is counted up to "2".

Next, in the frame 3, the pursuit judgment process is performed on the basis of the result of detection by the face detection section 124; accordingly, the positions and sizes of the elements [1] and [2] in the subject list are updated. As is the case with the previous frame, since the elements [1] and [2] satisfy the conditions, the extraction process and the collation process are performed, and the collation result list is updated.

Next, in the collation judgment for the element [1] shown in FIGS. 11 and 12, the degree of similarity with the registered person "SATOSHI" is compared with the threshold A. Here, since the similarity degree exceeds the threshold A, and the judged person corresponds to the identification candidate person, the number of judgments for the element [1] in the subject list is counted up to "2". Next, the collation judgment is performed for "MASAHIRO" corresponding to the element [2]. As is the case with the previous frame, the degree of similarity with the registered person "MASAHIRO" shown FIGS. 11 and 12 is compared with the threshold A. Here, since the similarity degree exceeds the threshold A, and the judged person corresponds to the identification candidate person, the number of judgments for the element [2] in the subject list is counted up to "3".

Here, since the number of judgments is "3" in the identification judgment process, the element [2] is identified as the registered person "MASAHIRO", and adds the registration number 2 of the registered person "MASAHIRO" to the "identified person". Then, "MASAHIRO", the name of the identified person, is caused to be drawn by the drawing section 140. At this time, since the element [1] is specified as the main subject by the user, "1" is stored in the main subject information in the RAM 102.

Next, in the frame 4, pursuit judgment is executed on the basis of the result of detection by the face detection section 124, and the positions and sizes of the elements [1] and [2] in the subject list are updated. Though the element [1] satisfies the conditions as is the case with the previous frame, the element [2] is identified. Therefore, the extraction process and the collation process are performed for "SATOSHI" corresponding to the element [1], and the collation result list is updated.

Next, in the collation judgment for the element [1], since the registered person "MASAHIRO" is an identified person, the degree of similarity with the registered person "SATOSHI" shown in FIG. 11 is compared with the threshold A. Since the similarity degree exceeds the threshold A, and the judged person corresponds to the identification candidate person, the number of judgments for the element [1] in the subject list is counted up to "3". Here, since the number of judgments is "3" in the identification judgment, the element [1] is identified as the registered person "SATOSHI", and adds the registration number 1 of the registered person "SATOSHI" to the "identified person". Then, "SATOSHI", the name of the identified person, is caused to be drawn by the drawing section 140.

Next, since the recording is started in the frame 5, the registration number 1 of the identified registered person "SATOSHI" corresponding to the element [1], which is the main subject, is stored for the "already identified person at the time of starting recording". Then, in the frames 5 to 7, the detection process is performed by the face detection section 124, the pursuit judgment process is executed on the basis of the detection result, and the positions and sizes of the elements [1] and [2] in the subject list are updated. At this time, since all the registered persons have been identified, neither the extraction process nor the collation process is performed for any one of the elements. Here, in the frames 8 and 9, "SATOSHI" and "MASAHIRO" cannot be detected. Therefore, the pursuit judgment process is executed on the basis of a result of detection by the face detection section 124, and the elements [1] and [2] corresponding to "SATOSHI" and "MASAHIRO" are deleted. Since "SATOSHI", who is the main object" is not detected in the frame 8, the main subject information is set to "0".

Next, the face of "SATOSHI" can be detected again in the frame 10, an element (element [1]) is added to the subject list, and a position and a size are stored on the basis of the detection result. Then, the extraction process and the collation process are performed for the element [1], and the collation result list is updated.

Next, in the collation judgment for the element [1], since the degree of similarity with the registered person "MASAHIRO" shown in FIG. 11 is the greatest, this similarity degree is compared with a threshold. At this time, since the judged person does not correspond to the person already identified at the time of starting recording, the threshold B is used as the threshold. Since the similarity degree then is less than the threshold A, "0" is stored for "the number of judgments" for the element [1] corresponding to "SATOSHI" in the subject list, and "0" is stored for the "identification candidate person".

Next, in the frames 11 to 13, as is the case with the previous frame, the position and size of the element [1] are updated on the basis of the result of detection by the face detection section 124; the extraction process and the collation process are executed; and the collation result list is updated. In the collation judgment process, since the degree of similarity with the registered person "SATOSHI" shown in FIG. 11 is the greatest, this similarity degree is compared with the threshold. At this time, since the judged person corresponds to the already identified person at the time of starting recording, the threshold A is used as the threshold. Since the similarity degree exceeds the threshold A in all the frames, the CPU 101 stores the registration number 1 of the registered person "SATOSHI" for the "identification candidate person" for the element [1] in the subject list, and counts up the number of judgments. At this time, since the number of judgments is "3" in the identification judgment in the frame 13, the element [1] is identified as the registered person "SATOSHI", and the registration number 1 of the registered person "SATOSHI" is added to the "identified person". Then, "SATOSHI", the name of the identified person, is caused to be drawn by the drawing section 140.

Thus, according to the collation judgment process of FIGS. 10A and 10B, the frequency of a person, who is already identified as the main subject at the time of starting recording, being identified is increased, whereas the frequency of a person, who is already identified not as the main subject at the time of starting recording, being identified is decreased to less than that of the person as the main subject, and furthermore, the frequency of a person, who is not been identified at the time of starting recording, being misidentified is decreased much less, which improves the person search-ability with the recorded identification information used.

In short, the video camera 100 is configured to set the threshold for personal identification to a first threshold (a first value) which is a low threshold or a second threshold (a second value) which is a high threshold. In this video camera 100, the face of the person is detected from the image being shot when the user operates the video camera 100 to set recording pause. In this video camera 100, in order to positively perform the identification, the threshold for personal identification is set to the first threshold which is a low threshold to increase the probability of the face being identified as the face of the person. Though the possibility of misidentification also increases then, this video camera is in a state before image pickup.

Here, the user can judge whether the face is correctly identified or not by viewing display of an identification result displayed on the display section of this video camera 100. If it is judged that the face is correctly identified, the user starts recording by this video camera 100.

If recording is started by the video camera 100 in this way, control is performed so that the threshold for personal identification, which is to be a judgment criterion for identifying the face of the person identified at the time of recording pause, continues to be first threshold which is a low threshold. Whereby, it can be thought that the face of the person already identified at the time of starting recording is such a face that the user judged it to be correct by seeing an identification result and hence starts recording. Therefore, the face of the person already identified at the time of starting recording is identified with the use of a third threshold which is less than the second threshold to improve the number of identifications. This third threshold may be any threshold that is equal to or greater than the first threshold and less than the second threshold (the third value is equal to or greater than the first value and less than the second value). The first threshold may be continuously used as the third threshold.

That is, in this video camera 100, the face of the person is identified with the use of the low first threshold at the time of recording pause, and the result is displayed. Then, if image pickup is started while this identification result is displayed, it is judged that such a person that the possibility of not being misidentified even if identification is performed with the low first threshold is strong is included as a subject. Then, in this video camera 100, only a threshold used for identification the face of the person is set to the third threshold which is less than the second threshold set for other persons, at the time of performing image pickup.

Thereby, in this video camera 100, personal identification is positively performed for the person with the strong possibility of not being misidentified during recording so that the moving image or scene in which the face of the person appears can be extracted from the recorded moving image at the time of reproduction thereof.

In this video camera 100, it is also possible to set a face to be a main subject from among the faces of multiple persons, and, when recoding is started, set only a threshold used for identifying the face of the main subject to the third threshold. At this time, a personal identification threshold to be a judgment criterion for identifying the faces of persons other than the main subject (persons who did not exist at the time of starting recording, and the like) is set to the second threshold which is a high threshold to prevent misidentification. It should be noted that, in this video camera, it is possible to make setting so that the high second threshold is always used irrespective of whether before or after starting recording, in the case of identifying a person other than the main subject.

Furthermore, in this video camera 100, the third threshold is set for a face set as a main subject among the faces of persons already identified at the time of starting recording, and a fourth threshold which is greater than the third threshold and equal to or less than the second threshold is set for a face which is not selected as the main subject. That is, the third value is set for a face set as a main subject, and a fourth value which is greater than the third value and equal to or less than the second value is set for a face which is not selected as the main subject. The first threshold may be used as the third threshold, and the second threshold may be used as the fourth threshold.

In this video camera 100, if the similarity degree used for identifying the face of a main-subject person at the time of recording pause is equal to or greater than the first threshold but does not exceed the second threshold during a sampling time (during a judgment period) with a predetermined length, it is judged that the target person is not the main-subject person. In this video camera 100, a modification operation of automatically looking for the face of another person to set the face of the main-subject person is executed. This is because, if the second threshold is not exceeded during the sampling period, the possibility that the face of the main-subject person has been misidentified is strong.

Furthermore, in this video camera 100, if, though the face of the main-subject person is identified and displayed during recording pause, the user does not start recording until the sampling time (judgment period), which is a predetermined length of time, elapses, it is judged that the possibility of misidentification is strong. This video camera 100 may be configured so as to execute a re-identification modification operation of automatically looking for the face of another person to set the face of the main-subject person.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-145590 filed Jun. 30, 2011, which is hereby incorporated by reference herein in its entirety.

What is claimed is:

1. An image processing apparatus comprising:
an image pickup unit configured to shoot an image;
a recording unit configured to record the shot image in a nonvolatile recording medium;
a face detection unit configured to detect a face of a person from the shot image;
a feature value extraction unit configured to extract a feature value as information about personal appearance from the face of the person;
a collation unit configured to calculate the degree of similarity between the feature value of the face of the person extracted by said feature value extraction unit and a feature value of a face of any one of registered persons, each of which has a feature value of a face preliminarily stored;
an identification unit configured to identify, when the calculated degree of similarity is equal to or greater than a threshold, that the face of the person, of which the feature value is extracted, corresponds to the face of any one of the registered persons; and
a display unit configured to display the identification result of said identification unit,
wherein said identification unit
sets the threshold to a first value before recording of the shot image to the nonvolatile recording medium is started; and
sets the threshold to a second value which is greater than the first value, for the face of one of the registered persons who has not been identified at the time of starting the recording of the shot image, and sets the threshold to a third value which is equal to or greater than the first value and less than the second value, for the face of one of the registered persons who is already identified at the time of starting the recording of the shot image, after the recording of the shot image to the nonvolatile recording medium is started after said display unit has displayed the identification result of said identification unit.

2. The image processing apparatus according to claim 1, further comprising a main subject setting unit configured to set a main subject among faces detected by said face detection unit,
wherein said identification unit sets the threshold to the first value before the recording of the image to the nonvolatile recording medium is started, and sets the threshold to the second value which is greater than the first value, for the face of one of the registered persons who has not been identified at the time of starting the recording of the image and sets the threshold to the third value which is equal to or greater than the first value and less than the second value, for the face of one of the registered persons who is already identified as the main subject at the time of starting the recording of the image, when the recording of the image to the nonvolatile recording medium is started after said display unit has displayed the identification result of said identification unit.

3. The image processing apparatus according to claim 2, wherein said identification unit sets the threshold to a fourth value which is greater than the third value and equal to or less than the second value, for the face of one of the registered persons who is identified not as the main subject at the time of staring the recording of the shot image, when the recording of the image to the nonvolatile recording medium is started after said display unit has displayed the identification result of said identification unit.

4. The image processing apparatus according to claim 2, wherein said collation unit calculates the degree of similarity with the face of the person set as the main subject, and said main subject setting unit determines that the face of the person set as the main subject does not correspond to the main subject if the set value of the threshold set by said identification unit does not transit from the first threshold to the second threshold during a judgment period before the recording of the image to the nonvolatile recording medium is started.

5. A control method for an image processing apparatus comprising an image pickup unit configured to shoot an image; a recording unit configured to record the shot image in a nonvolatile recording medium; a face detection unit configured to detect a face of a person from the shot image; a feature value extraction unit configured to extract a feature value as information about personal appearance from the face of the person; a collation unit configured to calculate the degree of similarity between the feature value of the face of the person extracted by said feature value extraction unit and a feature value of a face of any one of registered persons, each of which has a feature value of a face; an identification unit configured to identify, when the calculated the degree of similarity is equal to or greater than a threshold, that the face of the person, of which the feature value is extracted, corresponds to the face of any one of the registered persons; and a display unit configured to display the identification result of said identification unit, the control method comprising the steps of:
setting the threshold to a first value before recording of the shot image to the nonvolatile recording medium is started; and
setting the threshold to a second value which is greater than the first value, for the face of one of the registered persons who has not been identified at the time of starting the recording of the shot image, and setting the threshold to a third value which is equal to or greater than the first value and less than the second value, for the face of one of the registered persons who is already identified at the time of starting the recording of the shot image, after the recording of the shot image to the nonvolatile recording medium is started after said display unit has displayed the identification result of said identification unit.

6. A non-transitory computer-readable storage medium storing a program for causing a computer to implement a control method of an image processing apparatus according to claim 5.

7. An image processing apparatus comprising:
an image pickup unit configured to shoot a moving image;
a face detection unit configured to detect a face of a person from the shot moving image;
a feature value extraction unit configured to extract a feature value as information about personal appearance from the face of the person; and
an identification unit configured to determine that it is successful in identifying the face of the person, in case where a comparison result between the feature value of the face of the person extracted by said feature value extraction unit and a feature value of a face of any one of registered persons, each of which has a feature value of a face preliminarily stored, satisfies a predetermined condition, wherein said identification unit differentiates, from each other, the condition for the face of one of the registered persons who is already identified at the time of starting the recording of the shot moving image, and the condition for the face of one of the registered persons who has not been identified at the time of starting the recording of the shot moving image, after the recording of the shot moving image to a recording medium has been started.

8. The image processing apparatus as claimed in claim 7, wherein said identification sets the condition for the face of one of the registered persons who is already identified at the time of starting the recording of the shot moving image easier than the condition for the face of one of the registered persons who has not been identified at the time of starting the recording of the shot moving image, after the recording of the shot moving image to the recording medium has been started.

9. The image processing apparatus as claimed in claim 8, wherein the identification unit calculates the degree of similarity between the feature value of the face of the person extracted by said feature value extraction unit and the feature value of the face of any one of the registered persons, and determines that it is successful in identifying the face of the person, in case where the calculated degree of similarity is not less than a threshold value.

10. The image processing apparatus as claimed in claim 9, wherein the identification unit sets the threshold value for the face of one of the registered persons who is already identified at the time of starting the recording of the shot moving image less than the threshold value for the face of one of the registered persons who has not been identified at the time of starting the recording of the shot moving image, after the recording of the shot moving image to the recording medium has been started.

11. The image processing apparatus as claimed in claim 10, wherein the identification unit increases the threshold value after the recording of the shot moving image to the recording medium has been started than before the recording of the shot moving image to the recording medium is started.

12. The image processing apparatus as claimed in claim 7, wherein the recording medium comprises a nonvolatile recording medium.

13. A control method of an image processing apparatus having an image pickup unit configured to shoot a moving image, a face detection unit configured to detect a face of a person from the shot moving image, a feature value extraction unit configured to extract a feature value as information about personal appearance from the face of the person, and an identification unit configured to determine that it is successful in identifying the face of the person, in case where a comparison result between the feature value of the face of the person extracted by said feature value extraction unit and a feature value of a face of any one of registered persons, each of which has a feature value of a face preliminarily stored, satisfies a predetermined condition, the control method comprising:

a step of differentiating from each other, the condition for the face of one of the registered persons who is already identified at the time of starting the recording of the shot moving image, and the condition for the face of one of the registered persons who has not been identified at the time of starting the recording of the shot moving image, after the recording of the shot moving image to a recording medium has been started.

14. A non-transitory computer-readable storage medium storing a program for causing a computer to implement a control method of an image processing apparatus according to claim 13.

\* \* \* \* \*